US011791977B2

(12) United States Patent
Bockrath et al.

(10) Patent No.: US 11,791,977 B2
(45) Date of Patent: Oct. 17, 2023

(54) DUAL FALLBACK HARDENED VOIP SYSTEM WITH SIGNAL QUALITY MEASUREMENT

(71) Applicant: Clever Devices Ltd., Woodbury, NY (US)

(72) Inventors: Philip Bradley Bockrath, Issaquah, WA (US); Darryl G. Curtis, Mount Vernon, WA (US); Paul A. Dennis, Wake Forest, NC (US)

(73) Assignee: Clever Devices Ltd., Woodbury, NY (US)

( * ) Notice: Subject to any disclaimer, the term of this patent is extended or adjusted under 35 U.S.C. 154(b) by 0 days.

(21) Appl. No.: 17/878,252

(22) Filed: Aug. 1, 2022

(65) Prior Publication Data

US 2023/0023839 A1    Jan. 26, 2023

Related U.S. Application Data

(63) Continuation of application No. 17/105,932, filed on Nov. 27, 2020, now Pat. No. 11,405,175, which is a
(Continued)

(51) Int. Cl.
*H04L 9/00* (2022.01)
*H04L 65/00* (2022.01)
(Continued)

(52) U.S. Cl.
CPC .......... *H04L 9/002* (2013.01); *H04L 61/4535* (2022.05); *H04L 65/00* (2013.01);
(Continued)

(58) Field of Classification Search
CPC ..... H04L 9/002; H04L 67/01; H04L 61/4535; H04L 65/1073; H04L 65/00; H04L 45/22;
(Continued)

(56) References Cited

U.S. PATENT DOCUMENTS 6,968,180 B2   11/2005   Kirby ......................... 455/414.1
7,328,042 B2   2/2008   Choksi ....................... 455/552.1
(Continued)

FOREIGN PATENT DOCUMENTS

WO    WO-2016065036 A1 *   4/2016   .......... H04L 65/104

*Primary Examiner* — William Nealon
(74) *Attorney, Agent, or Firm* — Niro McAndrews, LLP

(57) ABSTRACT

A system is presented that includes secure push-to-talk voice functionality. Using encryption, authentication, user filtering, and integration with new and existing LMR systems, a secure voice platform ensures malicious software, unauthorized access and brute force security attacks will not compromise the voice communications of the system. The VoIP system is engineered to ensure graceful system degradation in the event of maintenance activities, natural disasters and failure modes. The hardened VoIP system offers the functions a LMR trunking system while utilizing broadband connections. Private calls, group calls, Emergency Alarms with covert monitoring capability, scanning and priority scanning may be incorporated into the system. The system includes a VoIP-controller that serves as a trunking controller, manages available VoIP-based conference bridges, and assigns them as needed to the parties involved in each voice call. The system includes multiple fallback methods that may be prioritized based on pre-failure analytics.

20 Claims, 12 Drawing Sheets

Related U.S. Application Data continuation of application No. 16/983,493, filed on Aug. 3, 2020, now abandoned, which is a continuation of application No. 16/727,538, filed on Dec. 26, 2019, now Pat. No. 10,735,180, which is a continuation-in-part of application No. 16/416,742, filed on May 20, 2019, now abandoned, which is a continuation of application No. 16/055,432, filed on Aug. 6, 2018, now Pat. No. 10,298,384, which is a continuation of application No. 15/584,688, filed on May 2, 2017, now Pat. No. 10,044,498.

(60) Provisional application No. 62/934,920, filed on Nov. 13, 2019, provisional application No. 62/435,562, filed on Dec. 16, 2016.

(51) Int. Cl.
| | | |
|---|---|---|
| *H04L 69/08* | (2022.01) | |
| *H04W 76/16* | (2018.01) | |
| *H04W 40/24* | (2009.01) | |
| *H04L 61/4535* | (2022.01) | |
| *H04L 51/00* | (2022.01) | |
| *H04L 45/00* | (2022.01) | |
| *H04W 4/10* | (2009.01) | |
| *H04L 65/1073* | (2022.01) | |
| *H04L 69/40* | (2022.01) | |
| *H04W 76/45* | (2018.01) | |
| *H04L 67/01* | (2022.01) | |
| *H04L 12/18* | (2006.01) | |

(52) U.S. Cl.
CPC .......... *H04L 65/1073* (2013.01); *H04L 67/01* (2022.05); *H04L 69/08* (2013.01); *H04L 69/40* (2013.01); *H04W 40/244* (2013.01); *H04W 76/16* (2018.02); *H04W 76/45* (2018.02); *H04L 12/1827* (2013.01); *H04L 45/22* (2013.01); *H04L 51/00* (2013.01); *H04W 4/10* (2013.01)

(58) Field of Classification Search
CPC ...... H04L 45/10; H04W 76/16; H04W 76/45; H04W 40/244; H04W 4/10
USPC .......................................................... 455/410
See application file for complete search history.

(56) References Cited

U.S. PATENT DOCUMENTS

| | | | | |
|---|---|---|---|---|
| 7,633,914 | B2 | 12/2009 | Shaffer | 370/338 |
| 7,636,339 | B2 | 12/2009 | Shaffer | 370/338 |
| 7,639,634 | B2 | 12/2009 | Shaffer | 370/266 |
| 7,706,339 | B2 | 4/2010 | Shaffe | 370/338 |
| 7,724,743 | B2 | 5/2010 | Razdan | 370/392 |
| 7,751,348 | B2 | 7/2010 | Shaffer | 370/260 |
| 7,764,973 | B2 | 7/2010 | Shaffer | 455/520 |
| 7,792,899 | B2 | 9/2010 | Shaffer | 709/204 |
| 7,809,390 | B2 | 10/2010 | Shaffer | 455/518 |
| 7,831,270 | B2 | 11/2010 | Kalley | 455/518 |
| 7,839,811 | B2 | 11/2010 | Martinez | 370/312 |
| 7,860,070 | B2 | 12/2010 | Shaffer | 370/338 |
| 7,869,386 | B2 | 1/2011 | Shaffer | 370/260 |
| 7,970,425 | B2 | 6/2011 | Balachandran | 455/519 |
| 8,045,998 | B2 | 10/2011 | Shaffer | 455/456.2 |
| 8,085,671 | B2 | 12/2011 | Shaffer | 370/237 |
| 8,145,249 | B2 | 3/2012 | Shaffer | 455/518 |
| 8,145,262 | B2 | 3/2012 | Martinez | 455/552.1 |
| 8,169,983 | B2 | 5/2012 | Janky | 370/338 |
| 8,189,460 | B2 | 5/2012 | Shaffer | 370/229 |
| 8,194,682 | B2 | 6/2012 | Martinez | 370/401 |
| 8,233,422 | B2 | 7/2012 | Martinez | 370/312 |
| 8,260,338 | B2 | 9/2012 | Shaffer | 455/518 |
| 8,279,868 | B2 | 10/2012 | Martinez | 370/392 |
| 8,280,422 | B2* | 10/2012 | Forsten | H04W 76/45 455/518 |
| 8,359,066 | B2 | 1/2013 | Martinez | 455/552.1 |
| 8,385,964 | B2 | 2/2013 | Haney | 455/519 |
| 8,396,002 | B2 | 3/2013 | Marshall-wilson | 370/252 |
| 8,406,168 | B2 | 3/2013 | Richeson | 370/328 |
| 8,472,418 | B2 | 6/2013 | Shaffer | 370/338 |
| 8,537,743 | B2 | 9/2013 | Barave | 370/328 |
| 8,547,856 | B2 | 10/2013 | Spring | 370/252 |
| 8,570,909 | B1 | 10/2013 | Shaffer | 370/260 |
| 8,634,799 | B1 | 1/2014 | Economy | 455/404.1 |
| 8,661,253 | B2 | 2/2014 | Wen | 713/168 |
| 8,676,243 | B2 | 3/2014 | Blanco | 455/518 |
| 8,676,244 | B2 | 3/2014 | Blanco | 455/518 |
| 8,712,441 | B2 | 4/2014 | Haney | 455/456.3 |
| 8,750,898 | B2 | 6/2014 | Haney | 455/456.1 |
| 8,798,593 | B2 | 8/2014 | Haney | 455/414.1 |
| 8,798,645 | B2 | 8/2014 | Haney | 455/456.2 |
| 8,798,647 | B1 | 8/2014 | Haney | 455/456.3 |
| 8,831,635 | B2 | 9/2014 | Haney | 455/456.2 |
| 8,874,159 | B2 | 10/2014 | Shaffer | 455/519 |
| 8,976,730 | B2 | 3/2015 | Chu | 370/328 |
| 8,989,740 | B2 | 3/2015 | Economy | 455/436 |
| 9,031,581 | B1 | 5/2015 | Haney | 455/456.3 |
| 9,042,929 | B2 | 5/2015 | Kuehner | 455/518 |
| 9,065,679 | B2 | 6/2015 | Martinez | |
| 9,112,746 | B2 | 8/2015 | Shaffer | |
| 9,161,272 | B2 | 10/2015 | Ofir | |
| 9,167,381 | B2 | 10/2015 | Mcdonald | |
| 9,167,558 | B2 | 10/2015 | Haney | |
| 9,173,134 | B2 | 10/2015 | Chen | |
| 9,185,522 | B1 | 11/2015 | Haney | |
| 9,253,616 | B1 | 2/2016 | Haney | |
| 9,277,428 | B2 | 3/2016 | Chowdhary | |
| 9,307,370 | B1* | 4/2016 | Pai | H04W 76/16 |
| 9,319,850 | B2 | 4/2016 | Lin | |
| 9,467,832 | B2 | 10/2016 | Haney | |
| 9,480,096 | B1 | 10/2016 | Lee | |
| 2002/0151321 | A1 | 10/2002 | Winchell | 455/519 |
| 2002/0196781 | A1 | 12/2002 | Salovuori | 370/352 |
| 2004/0121781 | A1 | 6/2004 | Sammarco | 455/456.1 |
| 2006/0084457 | A1 | 4/2006 | Laha | 455/519 |
| 2006/0291400 | A1* | 12/2006 | Balasaygun | H04L 65/1101 370/242 |
| 2007/0105578 | A1 | 5/2007 | Shaffer | 455/518 |
| 2007/0280203 | A1 | 12/2007 | Shaffer | 370/352 |
| 2008/0031275 | A1* | 2/2008 | Janky | H04W 12/03 370/466 |
| 2008/0171533 | A1* | 7/2008 | Sharp | H04W 88/16 455/410 |
| 2008/0200162 | A1* | 8/2008 | Chowdhury | H04W 76/45 455/422.1 |
| 2008/0205321 | A1* | 8/2008 | Martinez | H04W 76/45 370/312 |
| 2009/0054029 | A1 | 2/2009 | Hogberg | 455/404.2 |
| 2014/0348066 | A1* | 11/2014 | Patel | H04W 4/10 370/328 |
| 2015/0057040 | A1* | 2/2015 | Kuehner | H04W 4/08 455/509 |
| 2015/0079919 | A1 | 3/2015 | Shahaf | 455/404.1 |
| 2015/0079920 | A1 | 3/2015 | Mcdonald | 455/404.1 |
| 2015/0172875 | A1 | 6/2015 | Lin | 455/518 |
| 2016/0036624 | A1* | 2/2016 | Roy | H04L 43/0811 370/221 |
| 2016/0066177 | A1* | 3/2016 | Natarahjan | H04W 76/45 370/312 |
| 2016/0095067 | A1 | 3/2016 | Jurzak | 370/311 |
| 2016/0105291 | A1* | 4/2016 | Anchan | H04W 76/14 370/312 |
| 2016/0105773 | A1 | 4/2016 | Wawrowski | 455/456.2 |
| 2016/0135230 | A1* | 5/2016 | Swierczynski | H04W 76/45 455/518 |
| 2016/0219418 | A1* | 7/2016 | Sakazume | H04W 4/10 |
| 2016/0226937 | A1* | 8/2016 | Patel | H04W 4/10 |
| 2016/0227384 | A1 | 8/2016 | Mazzarella | 455/519 |
| 2016/0269876 | A1 | 9/2016 | Senese | 455/518 |
| 2017/0006448 | A1 | 1/2017 | Igumnov | |

(56) References Cited

U.S. PATENT DOCUMENTS

| | | |
|---|---|---|
| 2017/0006449 A1 | 1/2017 | Igumnov |
| 2017/0231014 A1* | 8/2017 | Patel .................. H04W 76/45 |
| 2018/0054350 A1* | 2/2018 | Roy .................... H04W 24/04 |

* cited by examiner

Fig. 5

| | Device Number | MAC Address | IMEI | Talk Group | Status | LMR-Talk (Mhz) | LMR-Receive (MHz) |
|---|---|---|---|---|---|---|---|
| 501 | 355503 | F3-C0-FA-19-E7-9F | 45568791993080 4 | 24601 | LTE | 860.0375 | 815.0375 |
| 502 | 524502 | 8F-19-85-D9-3B-0B | 53141037474031 3 | 24601 | LTE | 860.0375 | 815.0375 |
| 503 | 973456 | E8-7C-FF-54-22-56 | 53141037474031 3 | 24601 | LMR | 860.0375 | 815.0375 |
| 504 | 221567 | 1D-5B-06-3B-D6-CD | 10667153372032 3 | 24601 | LMR | 860.0375 | 815.0375 |
| 505 | 355618 | EA-F3-74-C0-01-10 | 50792328667802 5 | 24601 | LTE | 860.0375 | 815.0375 |
| 506 | 876211 | 29-DC-F1-F5-2C-1B | 49968199415414 9 | 86753 | LTE | 857.3375 | 860.3375 |
| 507 | 569517 | 8E-AD-5A-86-6D-72 | 30554078465124 9 | 86753 | WiFi | 857.3375 | 860.3375 |
| 508 | 924646 | 0D-96-CF-C8-73-5C | 50239531959692 7 | 86753 | LTE | 857.3375 | 860.3375 |
| 509 | 159605 | 18-08-9E-A6-35-F2 | 45831891271552 4 | 86753 | LTE | 857.3375 | 860.3375 |

Fig. 11

| | Data | Voice |
|---|---|---|
| 1010 | Primary Data Mode | Primary Voice Resource |
| 1020 | Primary Data Mode | Secondary Voice Resource |
| 1030 | Primary Data Mode | Tertiary Voice Resource |
| 1040 | Secondary Data Mode | Primary Voice Resource |
| 1050 | Secondary Data Mode | Secondary Voice Resource |
| 1060 | Secondary Data Mode | Tertiary Voice Resource |
| 1070 | Tertiary Data Mode | Primary Voice Resource |
| 1080 | Tertiary Data Mode | Secondary Voice Resource |
| 1090 | Tertiary Data Mode | Tertiary Voice Resource |

DUAL FALLBACK HARDENED VOIP SYSTEM WITH SIGNAL QUALITY MEASUREMENT

CROSS-REFERENCE TO COPENDING APPLICATIONS

This application is a continuation of U.S. patent application Ser. No. 17/105,932 that was filed on Nov. 27, 2020 entitled "Dual Fallback Hardened VoIP System with Signal Quality Measurement" and issued on Aug. 2, 2022 as U.S. Pat. No. 11,405,175, a continuation of U.S. patent application Ser. No. 16/983,493 that was filed on Aug. 3, 2020, entitled "Dual Fallback Hardened VoIP System with Signal Quality Measurement" that was a continuation of U.S. patent application Ser. No. 16/727,538 that was filed on Dec. 26, 2019, entitled "Dual Fallback Hardened VoIP System with Signal Quality Measurement," and issued on Aug. 4, 2020 as U.S. Pat. No. 10,735,180 that claimed priority to U.S. Provisional Application No. 62/934,920 filed on Nov. 13, 2019, entitled "Hardened VoIP System," and was a continuation-in-part of U.S. patent application Ser. No. 16/416,742 that was filed on May 20, 2019, titled "Hardened VoIP System" that was a continuation of U.S. patent application Ser. No. 16/055,432 titled "Hardened VoIP System" filed on Aug. 6, 2018, issued as U.S. Pat. No. 10,298,384 on May 21, 2019, and was a continuation of application Ser. No. 15/584,688 that was filed on May 2, 2017 and issued as U.S. Pat. No. 10,044,498 on Aug. 6, 2018 and claimed priority to U.S. Provisional Patent Application 62/435,562 filed Dec. 16, 2016 and entitled "Hardened VoIP System," the contents of which are herein all fully incorporated by reference.

FIELD OF THE INVENTION

The present invention relates generally to fault tolerant mobile communication systems, and specifically relates to hardened voice over IP (VoIP) systems with push to talk (PTT) functionality that integrate into existing land mobile radio (LMR) systems.

BACKGROUND OF THE INVENTION

LMR systems are wireless communications systems generally intended for use by terrestrial users in vehicles or on foot. Such systems are often used by emergency first responder organizations such as police, fire and ambulance services, public works organizations, dispatched services such as taxis, and companies with large vehicle fleets or numerous field staff. LMR systems are often independent, but can be connected to other fixed systems such as the public switched telephone network (PSTN) or cellular networks.

Radio over Internet Protocol (RoIP) is similar to VoIP, but augments two-way radio communications rather than telephone calls. With RoIP, at least one node of a network is a radio (or a radio with an IP interface device) connected via IP to other nodes in the radio network. The other nodes can be two-way radios, but can also be dispatch consoles, either traditional (hardware) or modern (software on a PC), plain old telephone service (POTS) telephones, softphone applications running on a computer such a smartphone or some other communications device accessible over IP. RoIP has been deployed over private networks as well as the Internet. RoIP has shown to be useful in land mobile radio systems used by public safety departments and utility fleets spread over a broad geographic area. Like other centralized radio systems such as trunked radio systems, issues of delay or latency and reliance on centralized infrastructure can be impediments to adoption by public safety agencies.

Examples of previous attempts to integrate LMR with VoIP include U.S. Pat. No. 8,145,262 issued to Martinez that claims to disclose a multimode LMR and a method of communicating LMR content using an LMR device. The Martinez LMR system includes an LMR communication portion and a cellular data network communication portion.

U.S. Pat. No. 8,169,983 issued to Janky claims to disclose a transcoder architecture and method for transcoding in LMR systems. The Janky LMR system includes a first communication site configured to communicate using a first LMR communication protocol and a second communication site configured to communicate using a second LMR communication protocol. The Janky LMR system further includes a transcoder configured to receive LMR content from the first communication site communicated using the first LMR communication protocol and digitally convert the LMR content to the second LMR communication protocol to be communicated to the second communication site.

U.S. Pat. No. 8,634,799 issued to Economy claims to disclose an incident commander computing device that dynamically reconfigures subscriber unit usage of radio access networks by first identifying, based at least on a type of incident occurring within a particular geographic area, a first incident response group having a first higher priority for responding to the incident and a second incident response group having a second lower priority for responding to the incident, then identifying a first higher priority radio access network having a sufficient coverage level across the particular geographic area and a second lower priority radio access network having a sufficient coverage level across the particular geographic area, and finally assigning the first incident response group to the first higher priority radio access network and assigning the second incident response group to the second lower priority radio access network.

U.S. Pat. No. 8,676,243 issued to Blanco claims to disclose a communication system that provides dual-watch and multi-watch capability for group PTT services where incoming PTT calls are prioritized and played out in accordance with prioritization protocols. In the Blanco system a user of multiple communication devices can hear received audio traffic being played out in accordance with the priority assigned to the group call and the priority assigned to the communication device, and numerous calls can be simultaneously received and managed.

U.S. Pat. Nos. 10,298,384 and 10,044,498 issued to Bockrath claims to disclose a hardened VoIP system that includes secure push-to-talk voice functionality. Bockrath claims that through the addition of encryption, authentication, user filtering, and integration with new and existing LMR systems, a secure voice platform ensures malicious software, unauthorized access and brute force security attacks will not compromise the voice communications of the system. The Bockrath VoIP system is engineered to ensure graceful system degradation in the event of maintenance activities, natural disasters and failure modes.

SUMMARY OF THE INVENTION

A hardened VoIP system is presented that includes secure PTT voice functionality. Through the addition of encryption, authentication, user filtering, and integration with new and existing LMR systems, a secure voice platform ensures malicious software, unauthorized access and brute force security attacks will not compromise the voice communications of the system. The VoIP system is engineered to ensure graceful system degradation in the event of maintenance activities, natural disasters and failure modes. The hardened VoIP system offers the functions a LMR trunking system while utilizing broadband connections. Private calls, group calls, Emergency Alarms with covert monitoring capability, scanning and priority scanning may be incorporated into the system. The system includes a VoIP controller that serves as a trunking controller, manages available VoIP based conference bridges, and assigns them as needed to the parties involved in each voice call.

The system allows for standard LMR functionality and the ability for supervisor tablets and smartphones to participate in and monitor VoIP calls between the dispatch center, mobile workforce and revenue vehicles. The system also provides supervisor tablets and smart phones the capability to scan talk groups in active calls, setup calls to other users, including closed microphone users, without dispatch or other third party intervention using the private call feature.

The hardened VoIP system provides an integrated mobile product that allows the system to gracefully fallback to the LMR infrastructure in the event of a broadband network outage. The integration of hardened VoIP and LMR allows new or existing LMR capital resources to be used to bridge various radio technologies and further allows switching algorithms to seamlessly and gracefully degrade from hardened VoIP to LMR without user intervention in the event of a broadband outage.

BRIEF DESCRIPTION OF THE DRAWINGS

Preferred embodiments are described with reference to the following drawings, wherein:

FIG. 5 illustrates an example of data that may be found in a talk group database.

FIG. 11 is s chart illustrating the various states configuration states of the system of FIG. 7.

DETAILED DESCRIPTION

The present invention may be used with any type of hardened communication system and is particularly suited for police, fire, and transit systems. However, for descriptive purposes, the present invention will be described in use with a municipal bus system.

Figure 1:
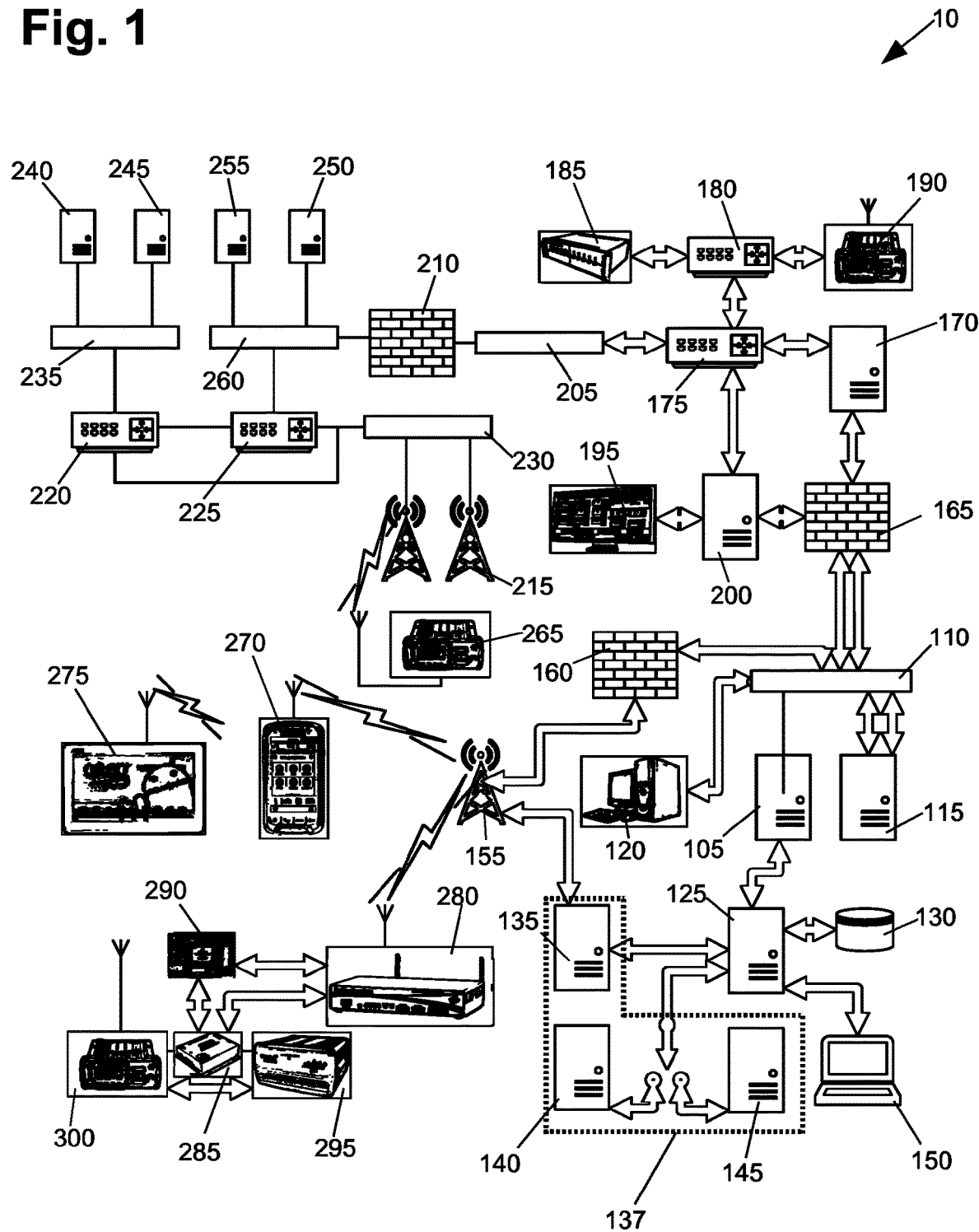
FIG. 1 illustrates an exemplary embodiment of a hardened VoIP system.

FIG. 1 shows a schematic of a hardened VoIP communication system 10 that includes a server 105 connected to a switch 110 that relays data to a data communication controller 115. Users may configure and/or monitor the system through the use of client devices 120 with access the switch 110. The server 105 also communicates with the VoIP channel controller 125 that receives and stores data from a VoIP database 130. The channel controller 125 is configurable to transmit data to both a local VoIP switch 135, a hosted VoIP Switch 140, and a hosted conference bridge 145. The local VoIP switch 135, the hosted VoIP switch 140, and the hosted conference bridge 145 are all session devices 137 that create SIP RTP sessions with mobile devices. A terminal 150 may be used to access and/or configure the VoIP Channel controller 125.

The VoIP switches (135, 140) are configured to communicate with commercial cellular towers 155 to transmit communications in an LTE, WiMax, EvDO UMTS, HSPA or similar format to distant communication devices.

In addition to communicating with the cellular towers 155 via the VoIP cannel controller 125, the server 105 is configured to also be able to communicate with the cellular towers 155 via the switch 110 through a firewall 160. In one example of the system, the switch 110 transmits data to the cellular towers 155 via an access point name gateway while in alternative embodiments an independent internet service provider is utilized to transmit data to the cellular towers.

In addition to communicating through cellular data formats, the switch 110 may transmit communications data through a firewall 165 to a server 170, such as a Zetron ACOM EVO server, that relays the communication to a dispatch switch 175 and a router panel 180 such as the Telex IP-224 Dual IP Remote Adapter Panel. The router panel 180 is connected by 4 wire audio to an RoIP rack 185 with Ethernet or cellular data connectivity and also via 4 wire audio to auxiliary LMR radios 190. Dispatchers may access the system through a console client 195 such as a Zetron ACOM EVO Client that communicates with the dispatch switch 175 via a dispatcher server 200.

A DMZ switch 205 is connected to the dispatch switch 175 and acts as a demilitarized zone, or perimeter network, that contains and exposes the system's external-facing services to a larger untrusted network. In addition to the DMZ switch 205, the radio dispatch functionality is also protected by another firewall 210.

The land mobile radio equipment includes LMR towers 215 that communicate with first and second routers (220, 225) via a backhaul switch 230. The first router 220 communicates with a LAN switch 235 and receives communications from VMS servers (240, 245). The second router 225 communicates with the DMZ switch 205, a gateway GPRS Support Node 250 and a PDG 255 via a second LAN switch 260.

By transmitting via both the cellular towers 155 and the LMR towers 215, the system is able to communicate with a variety of devices including LMR based devices 265 such as the Motorola APX6500. The system is able to communicate with bi-functional devices 270 such as the Motorola LEX L10 that has LTE connectivity as well as LMR connectivity. Additionally, the bi-functional devices 270 may be used to extend connectivity to Wi-Fi devices 275 that are closely located with the bi-functional devices 270. The system may also communicate with cellular exclusive devices 280 such as the Digi Router WR44, a commercial grade cellular to Wi-Fi converter. Through a Universal Radio Logic Controller 285 and proprietary onboard hardware 290, the cellular exclusive device 280 provides data to a vehicle logic unit 295 that delivers processing power and communication with other on-board technologies and may provide real-time access to schedule, route and traffic information, on-time performance data, and messages to and from dispatch. The Universal Radio Logic Controller 285 and the vehicle logic unit 295 are also be connected to an LMR Radio 300 that provides redundancy in the event off a malfunction in the cellular towers 155 or the cellular exclusive device 280.

The VoIP channel controller 125 of the illustrated system is a hardened VoIP controller and is configured to provide VoIP encryption, authentication, authorization, and accounting in a bandwidth efficient manner for the system. The VoIP channel controller 125 is shown as a single device in FIG. 1, however it should be appreciated that multiple geographically redundant VoIP channel controllers may be utilized in exemplary embodiments of the system such that an occurrence (fire, flood, power outage, etc.) at a single location would not disrupt communications in the overall system.

The RoIP rack 185 performs 4 wire LMR to VoIP conversions and has Ethernet or cellular connectivity. While there is a single RoIP rack 185 shown in FIG. 1, in an exemplary embodiment there is one module per talk group such that multiple RoIP racks may be utilized by the system. In the event of an RoIP rack failure, the multi-rack system is configured to automatically shift talk groups over to any available module on the other RoIP racks to ensure seamless degradation of the system upon a component failure.

The console client 195 is interfaced with the RoIP rack 185 and allows dispatchers to access specific talk groups, and or reconfigure specific talk groups as needed. CSSI, DFSI, and AFSI links may also be used to interface to LMR radio infrastructure.

Figure 2:
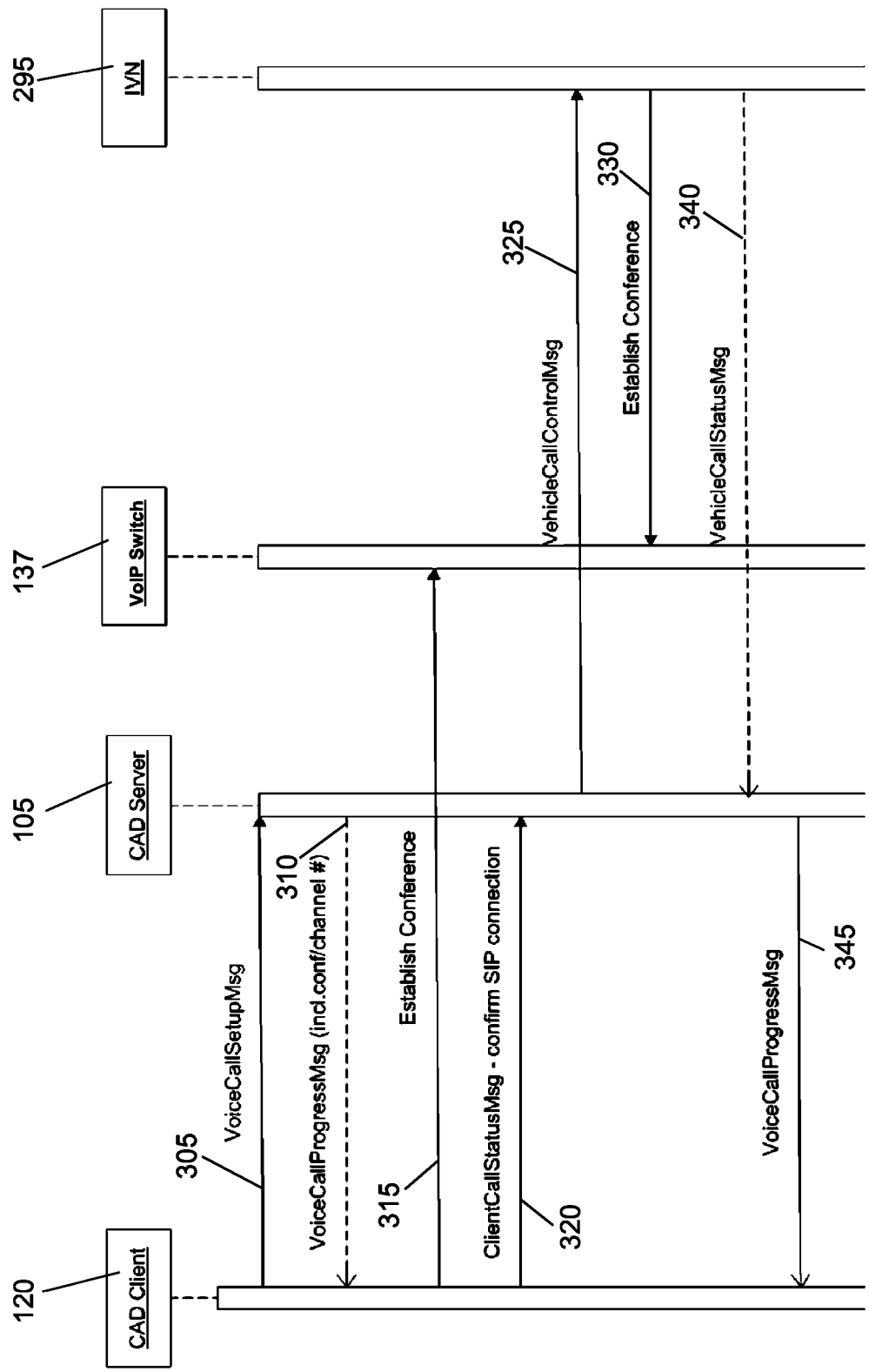
FIG. 2 illustrates an example of a VoIP solution for mobile devices.

FIG. 2 illustrates an example of a call setup from a client device 120 to a vehicle with a vehicle logic unit 295. The client 120 sends a setup message 305 to the server 105 that responds with a call progress message 310 that includes conference and channel numbers. Using the received information, the client device 120 establishes a conference bridge 315 to the session device 137 and transmits a call status confirmation 320 to the server 105 that relays a control message 325 to the vehicle logic unit 295 that in turn establishes a conference 330 with the preselected session device 137 while transmitting a confirmation 335 to the server 105. The server 105 then provides a progress message 340 to the client device 120.

While the system of FIG. 2 provides mobile VoIP capabilities there are a few issues with the system. In particular, the system requires a large amount of system bandwidth (e.g., 12 Mbps for a 350 vehicle call) due to iLBC vocoder requirements. Additionally, the system loses operability if the server 105 is taken offline or if the system is placed into administrative fall back.

Figure 3:
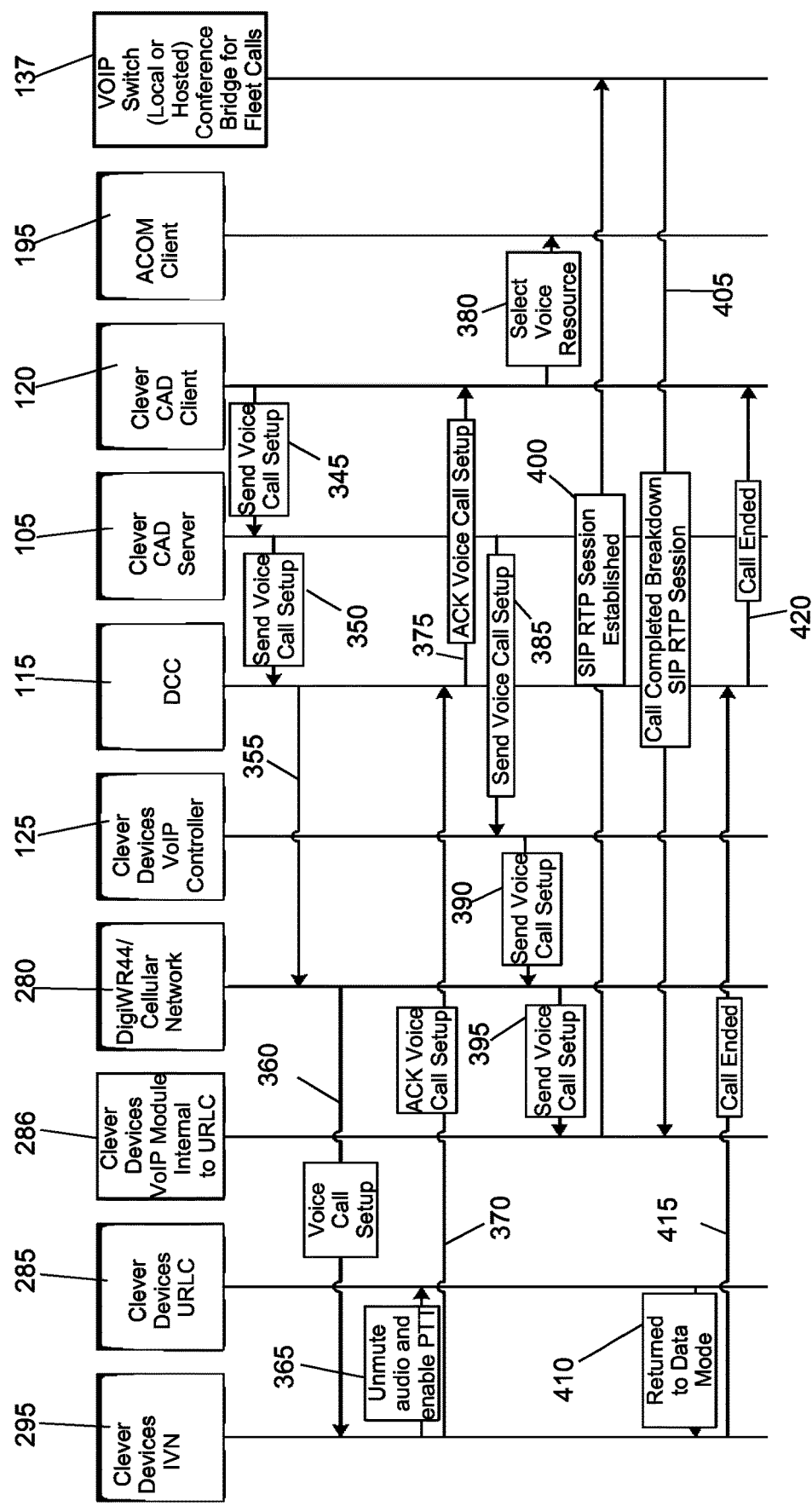
FIG. 3 illustrates an improved VoIP solution for mobile devices.

FIG. 3 illustrates an improved example of a VoIP call setup from a client device 120 client to a vehicle with a vehicle logic unit 295. In the illustrated example, the client device 120 sends a setup message 345 to the server 105 which relays the setup request 350 to the data communications controller 115. The data communications controller 115 transmits a setup signal 355 to the cellular exclusive devices 280 such as the Digi Router WR44 on board a vehicle. The cellular exclusive device 280 relays the setup request 360 to the vehicle logic unit 295 via the universal radio logic controller 285. In response to the setup request, the vehicle logic unit 295 sends a configuration communication 365 to the universal radio logic controller 285 to unmute audio and enable push-to-talk communication. The vehicle logic unit 295 sends an acknowledgment 370 to the data communications controller 115 wherein the voice call setup is relayed 375 to the client device 120 via the server 105. The client device 120 selects 380 the voice resource for the console client 195. The server 120 relays (385, 390, and 395) a VoIP call setup request to the Universal Radio Logic Controller 285 and a VoIP module 286 with Universal Radio Logic Controller 285. The VoIP module 286 establishes at 400 a session initiation protocol (SIP) real-time protocol (RTP) session with one of the session devices 137 (local VoIP switch 135, the hosted VoIP switch 140, or the hosted conference bridge 145). Upon the completion 405 of the session (either intentionally or unintentionally) the Universal Radio Logic Controller 285 signals 410 the vehicle logic unit 295 which relays (415, 420) the termination of the session to the client device 120 via the data communication controller 115.

Figure 4:
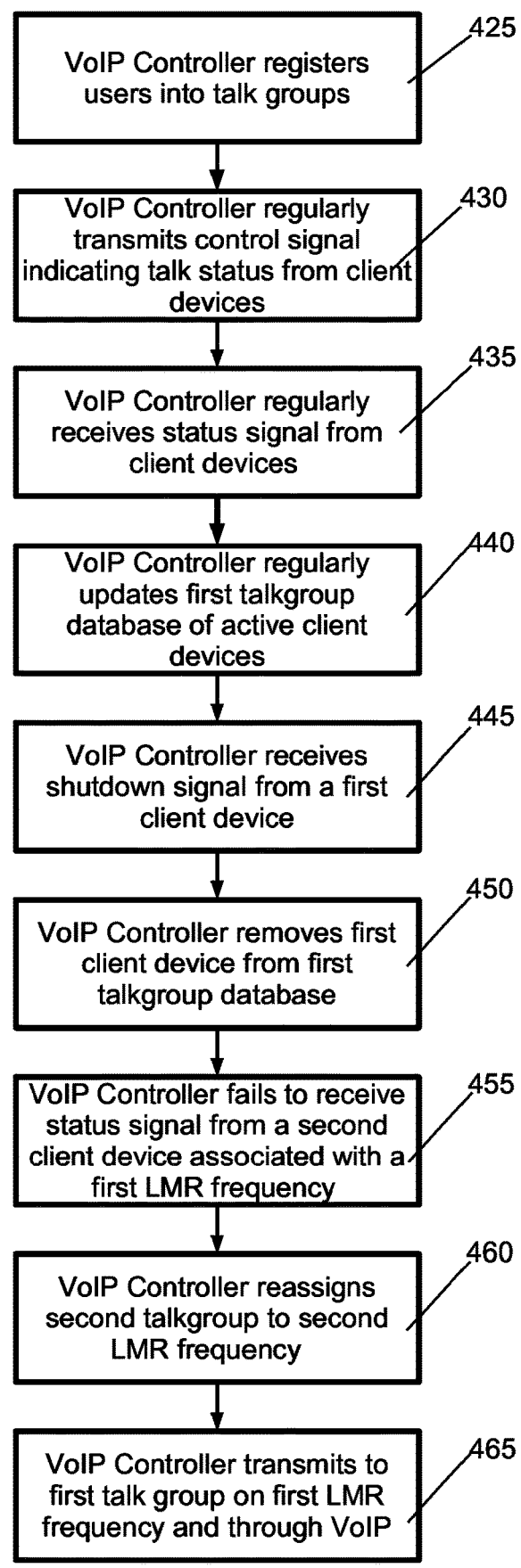
FIG. 4 illustrates a method of a VoIP controller registering client devices and updating talk group databases.

FIG. 4 illustrates an example of a registration method and graceful fallback in the event of a system deterioration. In step 425, the VoIP controller receives an initiation communication from a user client device and assigns the device to a talk group (fire talk group, transit talk group, police talk group, etc.). At regular intervals, at step 430, the VoIP controller transmits control signals to the client devices. The regular flow of transmissions from the VoIP controller to the client devices allows the Universal Mobile Access Radio Link Control (URLC) devices on the client devices to quickly determine if there has been a deterioration in the cellular based communication. In addition to regularly transmitting control signals or status signals in step 430*s*, the VoIP controller is configured to regularly receive status updates from client devices at step 435. These status signals received from the client devices may be referred to as heartbeat signals. Similar to the control signal from the VoIP controller allowing the client devices to determine if there has been a breakdown in VoIP communications, the status signals from the client devices allow the VoIP controller to determine which devices are active. In an exemplary embodiment of the invention, the control signals and status signals are both of small file size such that the cellular data usage is minimized while the system is in standby mode.

At step 440, the VoIP controller updates the database associated with active client database. Shown in FIG. 5 are examples of some of the information that may be associated with the various clients in the active client database. In step 445, the VoIP controller receives an intentional shutdown signal from a first client device, and in step 450 the VoIP controller removes the first client device from the active client database.

In step 455, the VoIP controller fails to receive a regular status signal from a second client device. Reasons for possible loss in signal include the second client device moving outside of a zone having cellular data coverage, a problem with a cellular tower, or a malfunction with the cellular data transmitter associated with the second client device. Before the cellular data communication failure, LMR communication frequencies were associated with the second client device and stored by both the second client device and the VoIP controller. With the cellular breakdown, the predetermined LMR frequencies are assigned to the second client device, and at step 460 the talk groups unassociated with the second client device are reassigned LMR communication frequencies. At step 465, in response to a push-to-talk signal, the VoIP controller facilitates a voice communication to the client devices in the first talk group. While the second client device receives communications via LMR, the other devices in the talk group may receive the communication via cellular data, or even local Wi-Fi. In an exemplary embodiment of the invention, the transition from cellular LTE to LMR communications occurs seamlessly and without any manual configuration by the users of the client devices. In one embodiment of the invention, the system initiates the transition from LTE to LMR communications upon a detection that the LTE signal quality has fallen below a non-zero predetermined threshold. In another embodiment, the predetermined threshold includes a percentage of packet loss or a duration of signal latency. In yet another embodiment, the threshold is determined based on metric that factors both packet loss and latency.

FIG. 5 illustrates some of the information that is stored by the VoIP controller in the active client database. With each client device there may be stored a unique device identifier 470 along with a MAC address 475 associated with Wi-Fi communications and an IMEI 480 associated with cellular communications. The talk group 485 associated with each group is stored in the active client database along with the currently utilized communication form 490 and the talk 495 and receive 500 frequencies for backup LMR communications. Client devices 501-505 are listed as being in the first talk group while client devices 506-509 are in the second talk group. Most of the client devices (501, 502, 505, 506, 508, and 509) are utilizing cellular communications protocols while two devices (503, 504) are communicating via LMR and one device 507 is communicating via a Wi-Fi link. The forms of communication in the database are not static and are expected to change. As an example, a client device 507 may be associated with a fire truck parked at a firehouse that communicates with the VoIP controller via the firehouse Wi-Fi. When the firetruck leaves the firehouse, the client device 507 automatically switches over to a cellular communication protocol once the firehouse's Wi-Fi access point is out of range. Should cellular and Wi-Fi communications be unavailable, the client device 507 on the firetruck would automatically begin to communicate using the predetermined land mobile radio frequencies (857.3375 and 860.3375 MHz). In an exemplary embodiment of the invention, the transition from Wi-Fi to cellular data to LMR and back is done automatically without any client user interaction and provides seamless fallback functionality such that a user may communicate using numerous different methods (Wi-Fi, LMR, satellite, etc.) without the user being aware that a change has occurred.

Figure 6:
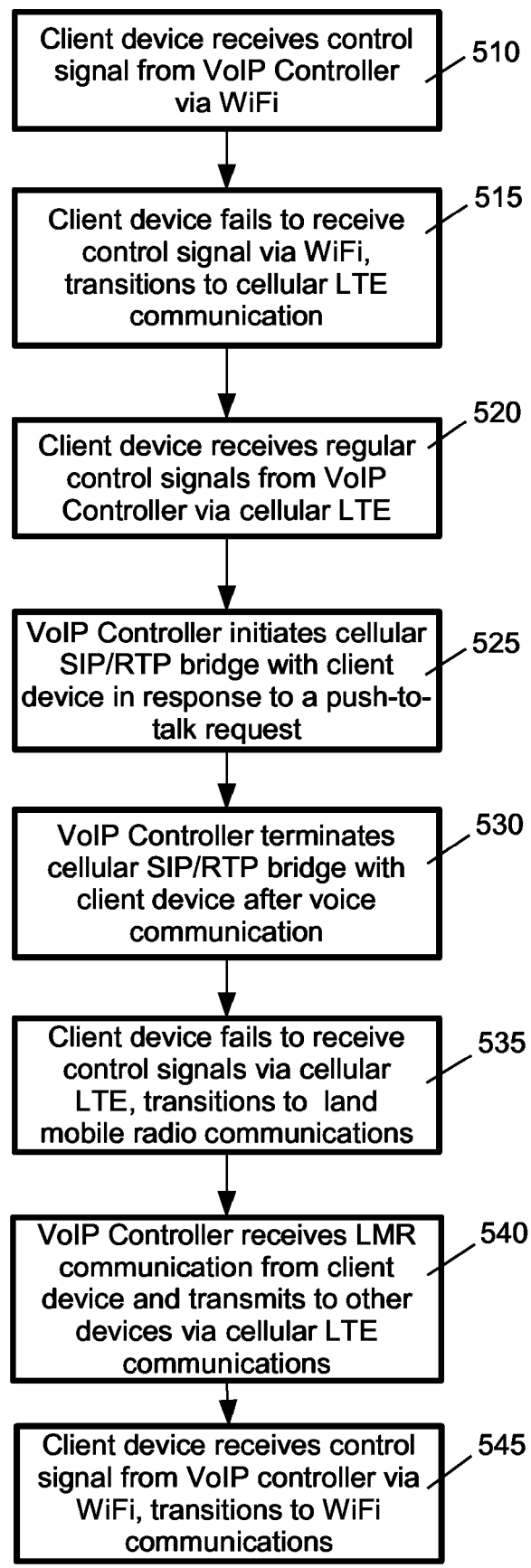
FIG. 6 is a flow diagram of a client device transitioning between numerous communication methods and systems.
Figure 7:
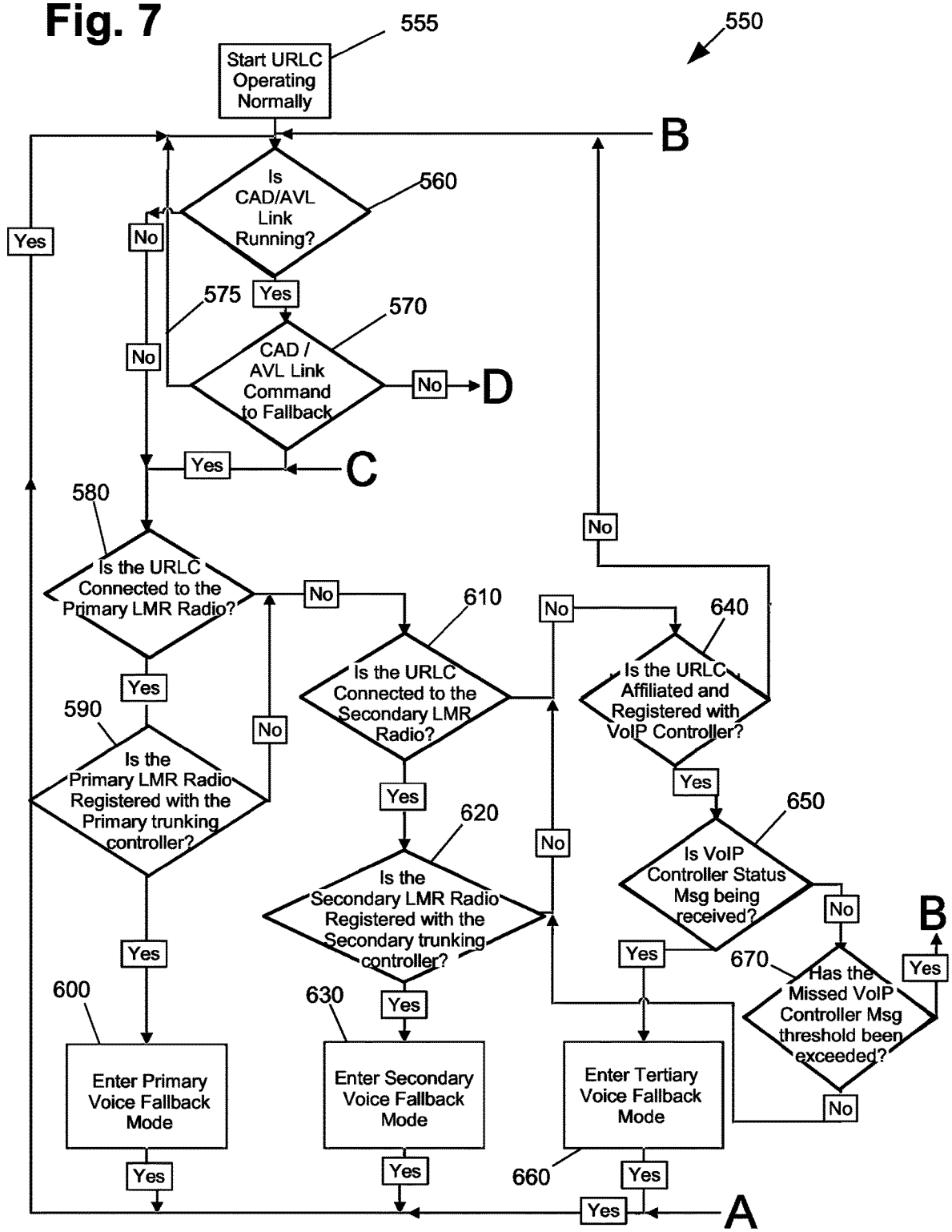
FIG. 7 is the first part of a flow diagram of a system with primary, secondary, and tertiary fallback modes of operation.
Figure 8:
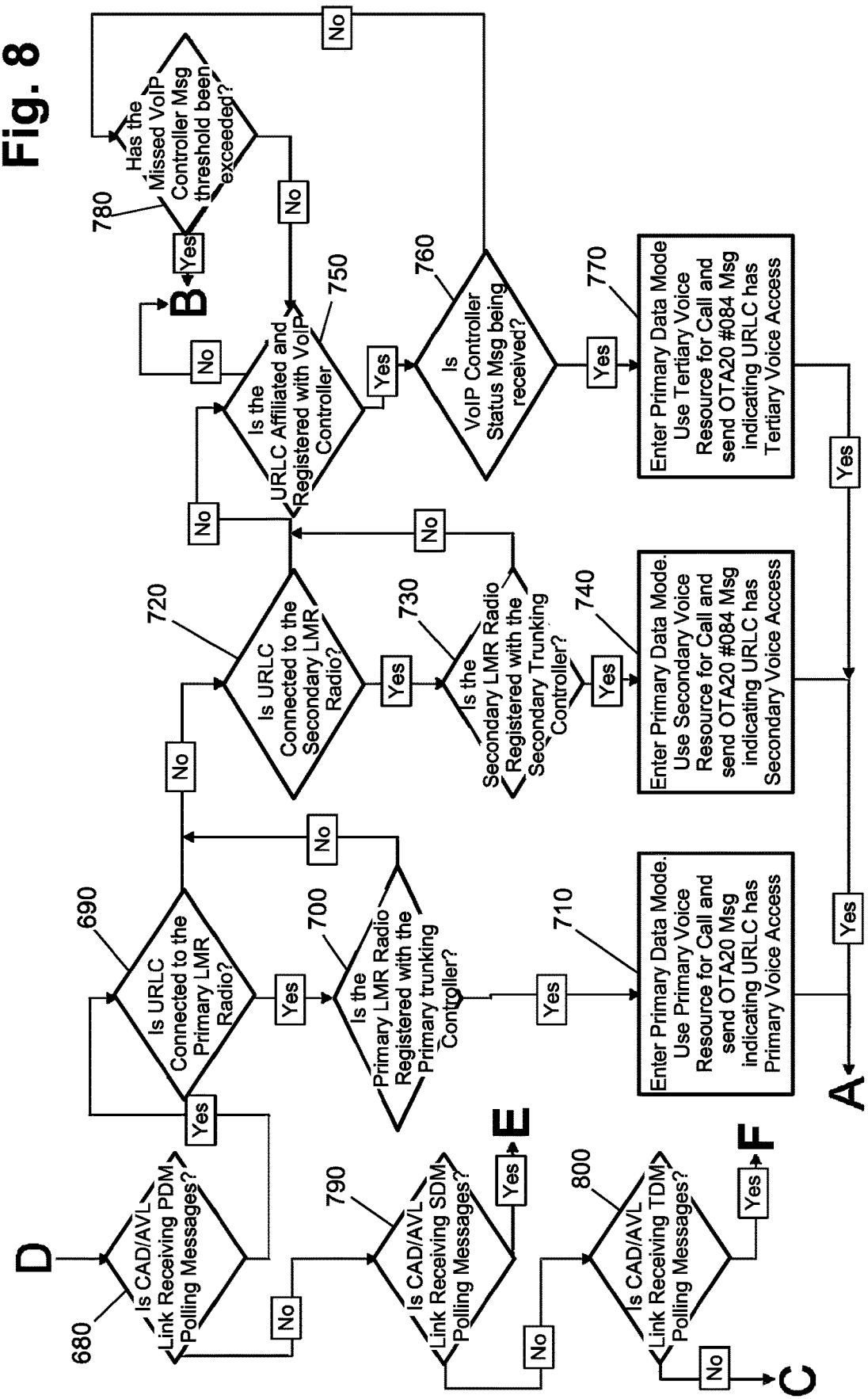
FIG. 8 is the second part of the flow diagram of FIG. 7.

FIG. 6 illustrates an example of a client device gracefully transitioning between multiple communication methods. At step 510, the client device regularly receives a control signal from a VoIP controller via Wi-Fi while the client device is in standby mode. A SIP/RTP bridge could be established by the VoIP controller upon a request to talk by a user. At step 515, the URLC aboard the client device detects that the control signal has not been received and transitions the client device to cellular communications. At step 520, the client device is once again in standby mode and at step 525 a SIP/RTP bridge is created between the client device and the VoIP controller in response to a voice communication. At step 530, the SIP/RTP bridge is terminated, and at step 535 the client device fails to receive the control signal via cellular or Wi-Fi communications so the client device transitions to land mobile radio communications. At step 540, the VoIP controller receives a LMR communication from the client device, and via cellular communications, establishes a SIP/RTP bridge with the other members of the client device's talk group. At step 545, the client device receives the control signal via Wi-Fi, and the LMR transmitter on the client device is deactivated.

System with Multiple Fallback Modes

FIGS. 7 through 10 illustrate an example of a hardened mobile communication system 550 with a primary fallback mode of operation, a secondary fallback mode of operation, and a tertiary fallback mode of operation. The system 550 is started at step 555 where the URLC, the Universal Mobile Access Radio Link Control, is started and is operating normally. At step 560, the system checks if the CAD/AVL link between the on vehicle URLC and controller is running. If the CAD/AVL link is running, the system then proceeds to step 570 where a check is made to see if the controller has issued a fallback command which would result in system proceeding to step 580. If the CAD/ACL link is not available in step 560 (such as when there is a VoIP service disruption), the system immediately proceeds to step 580 to begin the appropriate fallback. At step 580, the URLC checks to see if a primary land mobile radio is available. This check may include determining first LMR status signal has been received from the primary land mobile radio. If so, the system proceeds to step where the system determines if the available LMR is registered for communications on the primary trunking controller. If so, the system proceeds to step 600 and enters a primary fallback voice mode. This mode may be referred to as the first fallback state.

If either step 580 or step 590 are negative, the system proceeds to step 610 where the URLC checks to see is a secondary land mobile radio is available. This step may include determining if a second LMR status signal has been received from the second land mobile radio. Similar to step 580, if the secondary land mobile radio is available the system then proceeds to step 620 where the system determines if the available LMR is registered for communications on the secondary trunking controller. If so, the system proceeds to step 630 and enters secondary voice fallback mode. This may be referred to as the second fallback state.

If either step 610 or 620 are negative, the system then proceeds to steps associated with a tertiary fallback mode. At step 640, the system checks if the on vehicle URLC is affiliated with and registered a VoIP controller. If the URLC is not affiliated with a VoIP controller, the system then reverts back to the step 560 to again cycle through checking the availability of the CAD/AVL, primary LMR, and secondary LMR. If the URLC is affiliated with and registered with a VoIP controller, a check for status messages from the VoIP controller is made at step 650. If the status messages are received from the VoIP (i.e., the controller and URLC are in communication), the system then proceeds to step 660 and enters the tertiary fallback mode. If the check for status messages from the VoIP controller indicates that no messages are being received, the system proceeds to step 670 where a check is made on the number of missed messages, or the length of time that no controller status messages have been received. If the threshold of time, or missed messages has been exceed, the system loops back to step 640 and continues in a process loop until either a status messages is received or at step 650 or the threshold is exceeded in step 670. If the threshold is exceeded in step 670, the system reverts back to the step 560 to again cycle through checking the availability of the CAD/AVL, primary LMR, and secondary LMR.

If the CAD/AVL link is running in step 560, and the URLC does not receive a command to fallback at step 570, the system moves to step 680 (on FIG. 8) where the system determines if the CAD/AVL link is receiving PDM polling messages (or VoIP status signal). If the primary data mode (PDM) polling messages are received, the system moves to step 690 where the system determines if the URLC is connected to the primary LMR radio. This check may include determining first LMR status signal has been received from the primary land mobile radio. If so, the system then proceeds to a check in step 700 if the primary LMR radio is registered with the trunking controller. If registered, the system moves to step 710 where the system enters (or stays in) the primary data mode (PDM) using the primary voice resource, and the URLC sends a message indicating that it has primary voice resource access. This mode may be referred to as the first primary operational state.

When the system is fully operational, it is expected the system to loop through steps 560 to 570 to 680 to 690 to 700 to 710 and back again at regular intervals (such as once a minute). Although not shown in the flow diagrams of FIGS. 7 through 10, it expected that delay timers may be included in the flow to regulate how often the system checks the viability of the various fallback modes. As another option, in step 570 the NO path to step 680 may be triggered after an alternative path 575 has been triggered a set number of times, such as 512, 1024, or 2048, or may continue on following the alternate path 575 until a timer (such as a 30 second timer) has expired. The alternative path 575 may include a time delay, such as 20 milliseconds.

If either of the checks in steps 690 or 700 is negative, the system moves to step 720 where the system determines if the URLC is connected to the secondary LMR radio. This step may include determining if a second LMR status signal has been received from the second land mobile radio. If so, the system then proceeds to a check in step 730 if the secondary LMR radio is registered with the trunking controller. If registered, the system moves to step 740 where the system enters the primary data mode using the secondary voice resource and the URLC sends a message indicating that it has secondary voice access. This mode may be referred to as the second primary operational state. It is expected that failing to receive the LMR status message in step 690 will often result in the system entering the second primary operational state. If the system has been in the second primary operational state and step 690 is found to be affirmative (e.g., LMR status signals now received) the system will often transition from the second primary operational state back to the first primary operational state. In both the modes entered into in steps 710 and 740, the mobile device is configured to provide VoIP communications over a cellular communications system.

If either of the checks in steps 720 or 730 is negative, the system moves to step 750 where the system determines if the URLC is affiliated with and registered with a VoIP controller. If so, the system proceeds to step 760 where a check is made for whether VoIP controller status messages are being received. Step 760 is similar in function to step 650. If the check in step 760 is positive, the system moves to step 770 where the system enters the primary data mode using the tertiary voice resource and the URLC sends a message indicating that it has tertiary voice access.

If no VoIP controller status messages are received in step 760, the system proceeds to step 780 where a counter determines if the number, or duration, of missed VoIP controller messages has exceeded a predetermined threshold. This step is similar in structure to step 670. If the threshold has not been exceeded, the step loops back to step 750 to check for VoIP controller registration and status messages in step 760. If the missed message threshold is exceeded in step 780, or the URLC is no longer affiliated with a controller in step 750, the system reverts back to step 560.

If at step 680, no PDM polling messages are received, the system moves to step 790 where a check for secondary data mode (SDM) polling messages is made. If SDM messages are detected, the system enters the sequence shown in FIG. 10, but if no SDM messages are indicated then a check for tertiary data mode (TDM) polling messages is made in step 800. If TDM messages are detected, the system enters the sequences shown in FIG. 11, but if no TDM messages are detected then the system loops back to step 580.

Figure 9:
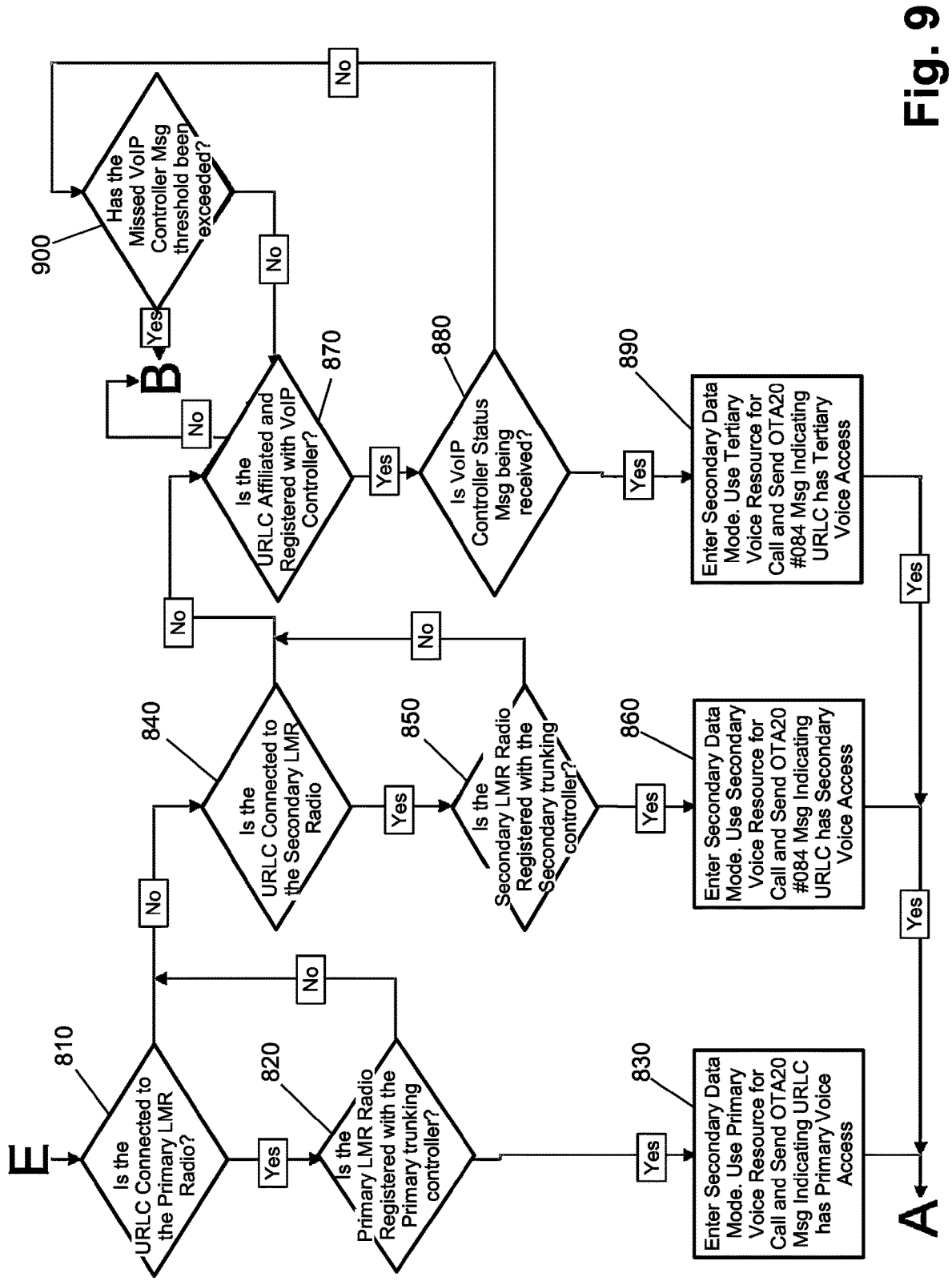
FIG. 9 is the third part of the flow diagram of FIG. 7.
Figure 10:
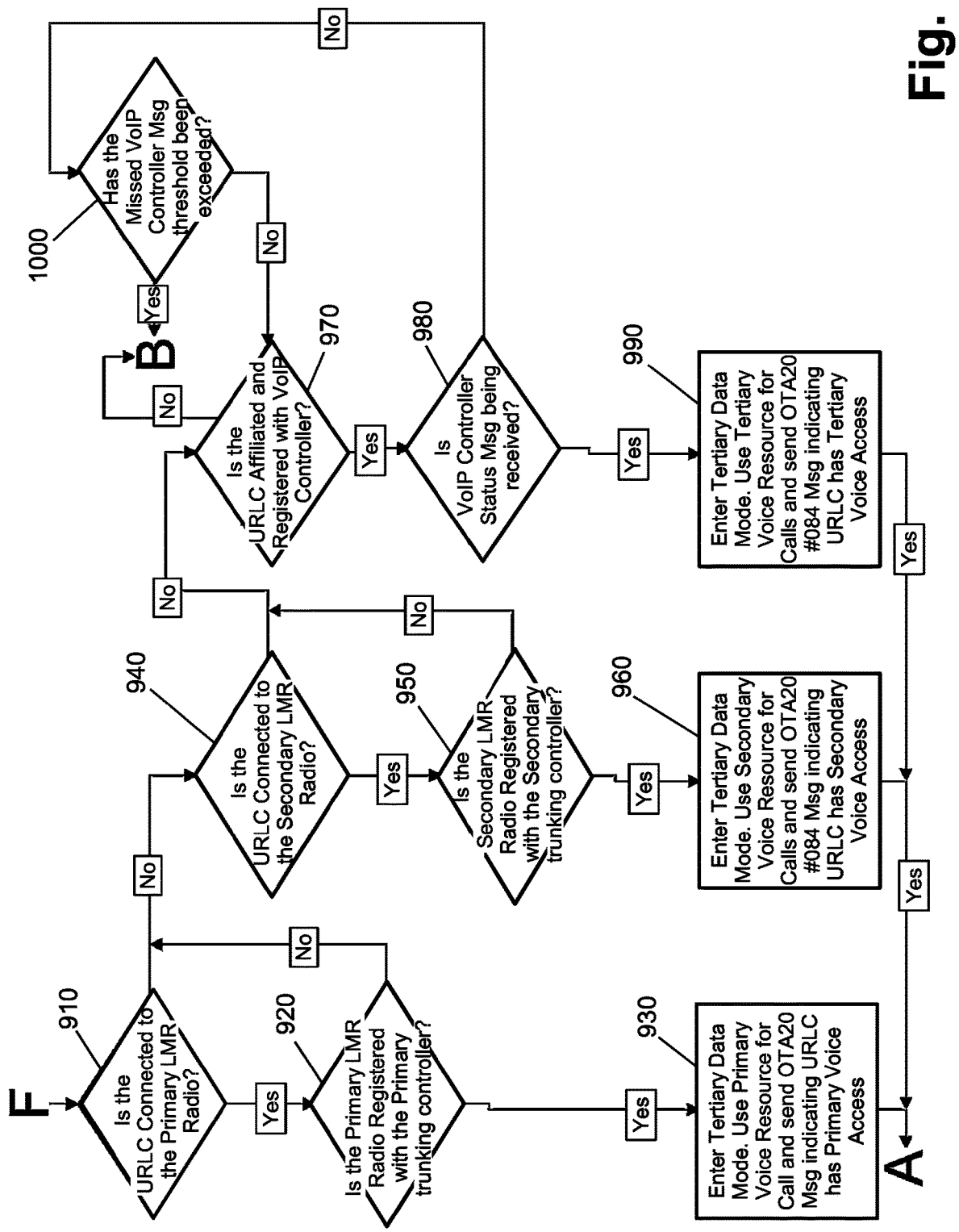
FIG. 10 is the fourth part of the flow diagram of FIG. 7.

The sequences shown in FIGS. 9 and 10 are similar to those shown in steps 690 through 680. Like in step 690, in steps 810 and 910 where the system determines if the URLC is connected to the primary LMR radio. This check may include determining first LMR status signal has been received from the primary land mobile radio. If so, the system then proceeds to a check in steps 820 or 920 if the primary LMR radio is registered with the primary trunking controller. If registered, the system moves to steps 830 or 930 where the system enters the secondary data mode (SDM) in step 840 or tertiary data mode (TDM) in step 940 using the primary voice resource, and the URLC sends a message indicating that it has primary voice resource access.

If either of the checks in steps 810 or 820 is negative, the system moves to step 840 where the system determines if the URLC is connected to the secondary LMR radio. If either of the checks in steps 910 or 920 is negative, the system moves to step 940 where the system determines if the URLC is connected to the secondary LMR radio. If so, the system then proceeds to a check in steps 850 or 950 if the secondary LMR radio is registered with the trunking controller. If registered, the system moves to steps 860 or 960 where the system enters the (secondary/tertiary) data mode using the secondary voice resource and the URLC sends a message indicating that it has secondary voice access.

If either of the checks in steps 840/850 or 940/950 is negative, the system moves to steps 870 or 970 where the system determines if the URLC is affiliated with and registered with a VoIP controller. This step may include determining if a second LMR status signal has been received from the second land mobile radio. If so, the system proceeds to step 880 or 980 where a check is made for whether VoIP controller status messages are being received. Steps 880 and 980 is similar in function to step 650. If the check in step 880 or 980 is positive, the system moves to step 890 or 990 where the system enters the secondary or tertiary, respectively, data mode using the tertiary voice resource and the URLC sends a message indicating that it has tertiary voice access.

If no VoIP controller status messages are received in steps 880 or 980, the system proceeds to steps 900 or 1000, respectively, where a counter determines if the number, or duration, of missed VoIP controller messages has exceeded a predetermined threshold. These steps are similar in structure to step 670. If the threshold has not been exceeded, the step loops back to step 870 or 970 to check for VoIP controller registration and status messages in steps 880 or 980. If the missed message threshold is exceeded in steps 900 or 1000, or the URLC is no longer affiliated with a controller in steps 870 or 970, the system reverts back to step 560.

After the transitions in steps 600, 630, 660, 710, 740, 770, 830, 860, 890, 930, 960, and 990, the system may start a timer that loops the system back to the previous steps.

FIG. 11 illustrates the various states that the system of FIGS. 7-10 may enter based on commands or signals received, or not received. In the state 1010, the data communications controller of the system is operating under a primary data mode, such as 3G or 4G cellular data, and the VoIP controller and URLC are using a primary voice resource such as land mobile radio. It is generally expected that during normal operation of the system, the configuration of state 1010 will be the most commonly used state.

In state 1020, the primary data channel is enabled, but the secondary voice resource, such as a secondary LMR system, has been selected instead of the primary voice resource. State 1020 would be entered in step 740. As an example, if the primary LMR was taken down for routine maintenance, the system would move to state 1020 as compared to state 1010 assuming that the primary data channel is still enabled.

In state 1030, the primary data channel is selected along with the tertiary voice method of communication. In the illustrated example shown in FIG. 8, the tertiary voice resource is a secondary VoIP system, however it should be appreciated the tertiary system may be a third LMR, a satellite radio system, or another type of system. In step 770, the system enters state 1030.

In states 1040, 1050, and 1060, the system has entered a secondary data mode in response to not receiving PDM polling messages through the CAD/AVL link in step 680 while also receiving SDM polling messages in step 790. As an example, the PDM messages may be sent through a CDMA network while the SDM messages may be sent through an alternative GSM cellular network. In another embodiment, the differences between the primary data mode and the secondary data mode may be 4G versus 3G communications. The primary and secondary data modes may include pairings that include two of the following 3G network, 4G network, GSM, LTE, CDMA, and 5G NR. States 1040, 1050, and 1060 are entered through steps 830, 860, and 890, respectively. In addition to providing standard mobile data (e.g., internet connectivity) in the various data modes, the system also carries short message service (SMS) and multimedia messaging service (MMS) type messaging on the primary, secondary, and tertiary data modes.

In states 1070, 1080, and 1090, the system has entered a tertiary data mode in response to not receiving SDM polling messages through the CAD/AVL link in step 790 while also receiving TDM polling messages in step 800. As an example, the SDM messages may be sent through a CDMA network while the TDM messages may be sent through an alternative GSM cellular network. In another embodiment, the differences between the secondary data mode and the tertiary data mode may be 3G versus 2G communications. States 1070, 1080, and 1090 are entered through steps 930, 960, and 990, respectively.

The various data shown in FIG. 5 may be included in the controller database shown in FIG. 5. As an example, each device listed in FIG. 5 may include an indicator specifying if it is using its first fallback LMR system as the fallback or the secondary LMR system as the fallback. The database may include Pre-Fallback Optimization The system may also utilize SIP/RTCP (Session Initiation Protocol/Real-Time Transport Control Protocol) that carries statistical and control data for determining when a fallback should be initiated, or if a first fallback mode should be queued for use over a second fallback mode while the system is still in its primary operating mode. In one embodiment, the SIP/RTCP measures a time window with early edge aligned with the delay corresponding to the earliest arriving packet and late edge representing the maximum permissible delay before a late arriving packet would be discarded. This measurement is also called the jitter buffer. The system also uses the SIP/RTCP to gather data on the transmission related to packet loss and latency. The system then performs a variety of statistical measurements on the jitter buffer and other measurements (such as round-up time) over a period of time including a sum of squares, a mean, a median, a standard deviation, and a moving average of these measurements over time. Either, or both, the mobile device or the fixed location structures may test for signal quality.

Using the information gathered from the SIP/RTCP, the system may make adjustment to further in improve the operability of the system. In a first example, the system measures the average depth of the jitter buffer over time. If the 10-second moving average is more than one standard deviation above the 500-second moving average the system will decrease thresholds used in steps 670, 780, or 900, or path 570. Additionally, the system may also adjust the duration of the various timers to help the system more quickly respond to further degradation of the system. If the jitter buffer depth then exceeds a second threshold (e.g., 10 second moving average is more than two standard deviations above the 500-second moving average) the system will fall back to an auxiliary communication mode even if the primary mode was still functionally operable. Alternatively, the second threshold may be a percentage of packet loss instead of jitter buffer depth. The specific numbers given are for illustrative purposes, and those skilled in the art will recognize that other durations and statistical measurements may be used in the monitoring of the communication quality. For example, in one embodiment, the system may measure the jitter depth and packet loss over a 500-millisecond range. In another embodiment, the system calculates the sum of squares of the jitter buffer. In yet, another embodiment, the system maintains a database of the conditions (jitter, latency, etc.) that occurred prior to a system fallback. Based on the recorded observations, the system increases or decreases the thresholds for preemptive events (e.g., lowering thresholds used in steps 670, 780, or 900) to a system fallback.

In addition to utilizing the SIP/RTCP to measure transmission quality, taking steps for preemptively adjust the system in advance of an expected fallback, the SIP/RTCP may also be used to provide SSL and TLS certificate-based encryption techniques for more secure communications.

Structure of System

Figure 12:
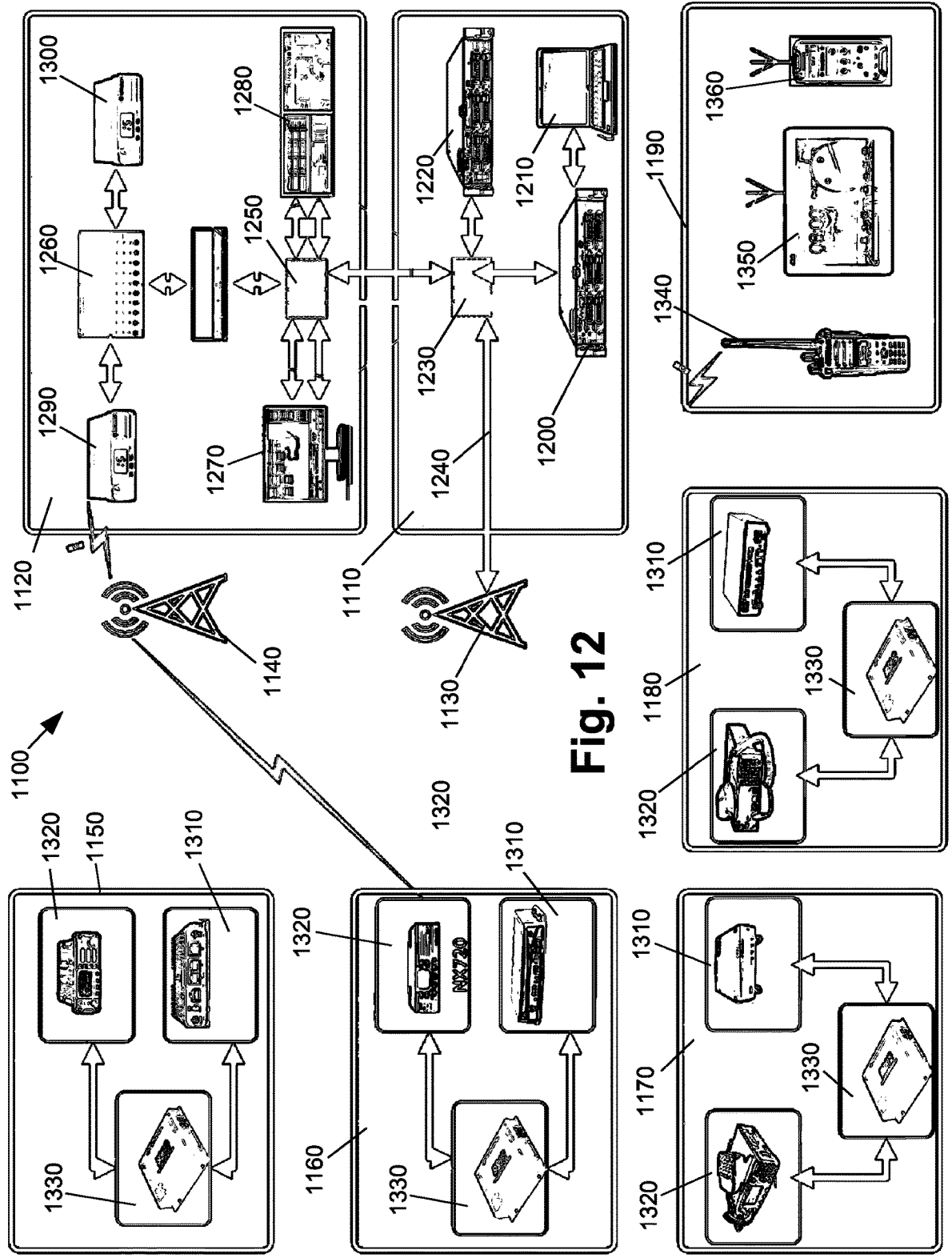
FIG. 12 illustrates an exemplary embodiment of a hardened VoIP system.

FIG. 12 illustrates another embodiment of the invention 1100 with server equipment 1110, dispatch equipment 1120, broadband connections 1130, LMR radio connections 1140, first, second, and third fleet vehicles (1150, 1160, and 1170, respectively), remote telemetry 1180, and other vehicle or portable devices 1190.

The server equipment 1110 includes a VoIP controller 1200 that is accessed through an NMS terminal 1210. The server equipment 1110 also includes a CAD server 1220 and a firewall 1230 through which the server equipment connects with the broadband connections 1130 and the dispatch equipment 1120. There is an access point name (APN) connection 1240 between the server firewall 1230 and the broadband connections 1130.

The dispatch equipment 1120 has a dispatch firewall 1250 connected to an RoIP Rack 1260. Dispatch radio consoles 1270 and CAD/AVL workstations 1280 are used for accessing the system. The RoIP Rack 1260 sends signals to both the LMR system 1290 and any emergency mutual aid channels 1300. The LMR system 1290 transmits to the LMR radio system 1140.

Each of the three fleet vehicles (1150, 1160, and 1170) and remote telemetry 1180 receives communications from the broadband connection 1130 through a cellular router 1310 such as the Cradlepoint IBR1100, the Digital Transport WR44, or the Digital Transport WR21, or the Sierra Wireless MG90. Each of the three fleet vehicles (1150, 1160, and 1170) and remote telemetry 1180 also receives communications from the LMR radio system 1140 via radios 1320 such as the Harris M7300, the Motorola APX 4500, the Kenwood NX-720, or the PowerTrunk MDT-400. The cellular router 1310 and the radios 1320 communicate with an onboard URLC 1330 having functionality previously described. In addition to communicating with the fleet vehicles (1150, 1160, and 1170) and the remote telemetry 1180, the system is also able to communicate with other devices such as LMR portable radios 1340, mobile devices with cellular connections 1350, and dual mode devices 1360 that are able to connect via LMR and cellular such as the Motorola Lex L11.

In addition to the features previously discussed, numerous other features may be incorporated into the hardened VoIP system. For example, an authentication subsystem may be used to validate that a device is allowed to access the hardened VoIP infrastructure, and an authorization subsystem may be used to ensure that a user and a user's password for the system are valid. Numerous accounting/billing schemes may be utilized by a variety of agencies or groups. For example, a taxi dispatch system may purchase a hardened VoIP system while offsetting a portion of the cost by selling talk group functionality to other organizations or even individuals.

Numerous agencies (fire, police, EMT, etc.) of a municipality may be supported by a single system, and the talk group trunking functionality may be utilized to allow the various agencies to share communications lines without interfering with each other. The system may include encryption functionality that provides various levels of encryption to ensure user compliance with privacy, local, state and federal regulations. A Network Management Subsystem client may also be used that allows for the addition, deletion, and editing of system parameters such as system IDs, talk groups, agencies, usernames, device IDs and passwords. The system may be configured to allow two users to converse or text without the rest of the user group hearing the conversation, a private call feature may be implemented to allow communications between two users rather than being broadcast to the active registered talk group users.

The inventors contemplate several alterations and improvements to the disclosed invention. Other alterations, variations, and combinations are possible that fall within the scope of the present invention. Although various embodiments of the present invention have been described, those skilled in the art will recognize more modifications that may be made that would nonetheless fall within the scope of the present invention. Therefore, the present invention should not be limited to the specific examples described.

We claim:

1. A system for providing hardened Voice over Internet Protocol (VOIP) and land mobile radio communication services to mobile devices, the system comprising:
   a mobile device and a controller having a first primary operational state, a secondary primary operational state, a first fallback state, and a second fallback state, the controller configured
      in the first primary operational state to
         receive via a cellular communications system a first VoIP heartbeat signal from the mobile device,
         receive a first Land Mobile Radio (LMR) status signal associated with a first land mobile radio system from the mobile device,
         maintain a database with
            a first identifier associating the mobile device with the cellular communications system and
            a second identifier associating the mobile device with the first land mobile radio system;
      in the second primary operational state to
         receive via the cellular communications system the first VoIP heartbeat signal from the mobile device,
         receive a second LMR status signal associated with a second land mobile radio system from the mobile device,
         maintain the database with
            the first identifier associating the mobile device with the cellular communications system and
            the second identifier associating the mobile device with the second land mobile radio system;
      in the second primary operational state to
         receive via a cellular communications system the first VoIP heartbeat signal from the mobile device,
         receive via a second land mobile radio system a second LMR status signal,
         transmit a first status control signal to the mobile device, and
         maintain a database with
            a first identifier associating the mobile device with the cellular communications system and
            a second identifier associating the mobile device with the second land mobile radio system;
      in the first fallback state to
         monitor a channel of the first land mobile radio system associated with the mobile device;
      in the second fallback state to
         monitor a channel of the second land mobile radio system associated with the mobile device;
      to transition from the first primary operational state to the first fallback state upon failing to receive the first VoIP heartbeat signal from the mobile device;
      to transition from the second primary operational state to the second fallback state upon failing to receive the first VoIP heartbeat signal from the mobile device;
   determine a signal quality of the cellular communications system with a Session Initiation Protocol/Real-Time Transport Control Protocol; and
   transmit a fallback command to the mobile device upon the signal quality passing a predetermined threshold.

2. The system of claim 1 wherein the controller is configured to transition from the first primary operational state to the second primary operational state upon receipt of a first message indicating the mobile device has secondary voice access.

3. The system of claim 1 wherein the controller is configured to
   transition from the first primary operational state to the first fallback state upon the signal quality passing a predetermined threshold.

4. The system of claim 1 wherein
   the second identifier associating the mobile device with the first land mobile radio system includes a first frequency;
   the second identifier associating the mobile device with the second land mobile radio system includes a second frequency; and
   the first frequency is different than the second frequency.

5. The system of claim 1 wherein the controller is configured to transition from the second primary operational state to the first primary operational state upon receiving the first LMR status signal.

6. A system for providing hardened Voice over Internet Protocol (VOIP) and land mobile radio communication services to mobile devices, the system comprising:

a mobile device and a controller having a first primary operational state, a secondary primary operational state, a first fallback state, and a second fallback state, the controller configured
in the first primary operational state to
receive via a cellular communications system
a first VoIP heartbeat signal from the mobile device,
receive a first Land Mobile Radio (LMR) status signal associated with a first land mobile radio system from the mobile device,
maintain a database with
a first identifier associating the mobile device with the cellular communications system and
a second identifier associating the mobile device with the first land mobile radio system;
in the second primary operational state to
receive via the cellular communications system the first VoIP heartbeat signal from the mobile device,
receive a second LMR status signal associated with a second land mobile radio system from the mobile device,
maintain the database with
the first identifier associating the mobile device with the cellular communications system and
the second identifier associating the mobile device with the second land mobile radio system;
in the second primary operational state to
receive via a cellular communications system the first VoIP heartbeat signal from the mobile device,
receive via a second land mobile radio system a second LMR status signal,
transmit a first status control signal to the mobile device, and
maintain a database with
a first identifier associating the mobile device with the cellular communications system and
a second identifier associating the mobile device with the second land mobile radio system;
in the first fallback state to
monitor a channel of the first land mobile radio system associated with the mobile device;
in the second fallback state to
monitor a channel of the second land mobile radio system associated with the mobile device;
to transition from the first primary operational state to the first fallback state upon failing to receive the first VoIP heartbeat signal from the mobile device;
to transition from the second primary operational state to the second fallback state upon failing to receive the first VoIP heartbeat signal from the mobile device; and
wherein the mobile device is
configured to
determine a signal quality of the cellular communications system with a Session Initiation Protocol/Real-Time Transport Control Protocol, and
the controller is configured to transition from the first primary operational state to the first fallback state upon the signal quality passing a predetermined threshold.

7. The system of claim 6 wherein
the mobile device is configured to use a measurement of at least one of packet loss and latency in determining the signal quality.

8. The system of claim 6 wherein the controller is configured to transition from the first primary operational state to the first fallback state upon the signal quality passing the predetermined threshold when the controller is receiving the first LMR status signal.

9. A system for providing hardened Voice over Internet Protocol (VOIP) and land mobile radio communication services to mobile devices, the system comprising:
a mobile device and a controller having a first primary operational state, a secondary primary operational state, a first fallback state, and a second fallback state, the controller configured
in the first primary operational state to
receive via a cellular communications system
a first VoIP heartbeat signal from the mobile device,
receive a first Land Mobile Radio (LMR) status signal associated with a first land mobile radio system from the mobile device,
maintain a database with
a first identifier associating the mobile device with the cellular communications system and
a second identifier associating the mobile device with the first land mobile radio system;
in the second primary operational state to
receive via the cellular communications system the first VoIP heartbeat signal from the mobile device,
receive a second LMR status signal associated with a second land mobile radio system from the mobile device,
maintain the database with
the first identifier associating the mobile device with the cellular communications system and
the second identifier associating the mobile device with the second land mobile radio system;
in the second primary operational state to
receive via a cellular communications system the first VoIP heartbeat signal from the mobile device,
receive via a second land mobile radio system a second LMR status signal,
transmit a first status control signal to the mobile device, and
maintain a database with
a first identifier associating the mobile device with the cellular communications system and
a second identifier associating the mobile device with the second land mobile radio system;
in the first fallback state to
monitor a channel of the first land mobile radio system associated with the mobile device;
in the second fallback state to
monitor a channel of the second land mobile radio system associated with the mobile device;
to transition from the first primary operational state to the first fallback state upon failing to receive the first VoIP heartbeat signal from the mobile device;
to transition from the second primary operational state to the second fallback state upon failing to receive the first VoIP heartbeat signal from the mobile device;
the mobile device and the controller both have the first primary operational state, the secondary primary operational state, the first fallback state, and the second fallback state;
the mobile device further includes a first auxiliary data state and a second auxiliary data state;
the controller and mobile device configured in the first auxiliary data state to
    send to the mobile device via an auxiliary data communications system an auxiliary data status signal from the controller,
    receive at the controller the first LMR status signal from the first land mobile radio system, and
    provide VOIP communication over the auxiliary data communications system; in the second auxiliary data state to
    send to the mobile device via the auxiliary data communications system the auxiliary data status signal from the controller,
    receive at the controller the second LMR status signal from the second land mobile radio system, and
    provide VOIP communication over the auxiliary data communications system;
    to transition from the first auxiliary data state to the first fallback state upon the mobile device failing to receive the auxiliary data status signal from the controller;
    to transition from second auxiliary data state to the second fallback state upon the mobile device failing to receive the auxiliary data status signal from the controller; and
    to transition from the first auxiliary data state to the second auxiliary data state upon the controller failing to receive the first LMR status signal.

10. The system of claim 9 wherein the mobile device and controller are further configured
    to transition from the first primary operational state to first auxiliary data state upon the controller failing to receive the first VOIP heartbeat signal from and the mobile device receiving the auxiliary data status signal; and
    to transition from the first primary operational state to first fallback state upon the controller failing to receive the first VoIP heartbeat signal and the mobile device failing to receive the auxiliary data status signal.

11. The system of claim 9 wherein
    the cellular communications system and auxiliary data communications system include a network pairing selected from a group consisting of two of 3G, 4G, GSM, LTE, CDMA, and 5G NR.

12. The system of claim 1 wherein
    the mobile device and the controller both have the first primary operational state, the secondary primary operational state, the first fallback state, and the second fallback state; and
    the mobile device is configured to transition from the first primary operational state to the first fallback state upon receipt of the fallback command from the controller.

13. The system of claim 1 wherein
    the system is configured to utilize a measurement of at least one of packet loss and latency in determining the signal quality of the cellular communications system.

14. The system of claim 1 wherein
    the controller is configured to verify receipt of the first VoIP heartbeat signal from the mobile device upon an expiration of a timer having a duration;
    the duration of the timer decreases upon the signal quality passing a predetermined threshold.

15. The system of claim 1 wherein
    the mobile device is configured to transmit a message to the controller upon
    the transition from the first primary operational state to the second primary operational state indicating the mobile device has secondary voice access.

16. The system of claim 6 wherein
    the controller is configured to verify receipt of the first VoIP heartbeat signal from the mobile device upon an expiration of a timer having a duration; and
    the duration of the timer decreases upon the signal quality passing a predetermined threshold.

17. The system of claim 9 wherein
    the controller is configured to verify receipt of the first VoIP heartbeat signal from the mobile device upon an expiration of a timer having a duration;
    at least one of the controller and the mobile device is configured to determine a signal quality of the cellular communications system with a Session Initiation Protocol/Real-Time Transport Control Protocol; and
    the duration of the timer decreases upon the signal quality passing a predetermined threshold.

18. The system of claim 6 wherein
    the second identifier associating the mobile device with the first land mobile radio system includes a first frequency;
    the second identifier associating the mobile device with the second land mobile radio system includes a second frequency; and
    the first frequency is different than the second frequency.

19. The system of claim 9 wherein
    the second identifier associating the mobile device with the first land mobile radio system includes a first frequency;
    the second identifier associating the mobile device with the second land mobile radio system includes a second frequency; and
    the first frequency is different than the second frequency.

20. The system of claim 6 wherein
    the mobile device is configured to transmit a message to the controller upon
    the transition from the first primary operational state to the second primary operational state indicating the mobile device has secondary voice access.

* * * * *